United States Patent
Sekine et al.

(10) Patent No.: US 10,178,251 B2
(45) Date of Patent: Jan. 8, 2019

(54) INFORMATION PROCESSING APPARATUS CONFIGURED TO NOTIFY ABOUT A SERVICE

(71) Applicant: FUJI XEROX CO., LTD., Tokyo (JP)

(72) Inventors: Yoshihiro Sekine, Kanagawa (JP); Chigusa Nakata, Kanagawa (JP); Hiroshi Honda, Kanagawa (JP); Eiji Nishi, Kanagawa (JP); Kenji Kuroishi, Kanagawa (JP); Hiroshi Mikuriya, Kanagawa (JP); Takeshi Furuya, Kanagawa (JP); Ryuichi Ishizuka, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/456,791

(22) Filed: Mar. 13, 2017

(65) Prior Publication Data

US 2018/0069971 A1 Mar. 8, 2018

(30) Foreign Application Priority Data

Sep. 2, 2016 (JP) .................................. 2016-171629

(51) Int. Cl.
 *H04N 1/00* (2006.01)
(52) U.S. Cl.
 CPC ....... *H04N 1/00344* (2013.01); *H04N 1/0009* (2013.01); *H04N 1/00018* (2013.01); *H04N 1/00037* (2013.01); *H04N 1/00058* (2013.01); *H04N 1/00079* (2013.01); *H04N 1/00323* (2013.01); *H04N 2201/0081* (2013.01); *H04N 2201/0093* (2013.01)

(58) Field of Classification Search
None
See application file for complete search history.

(56) References Cited

U.S. PATENT DOCUMENTS

| | | | |
|---|---|---|---|
| 6,304,523 B1 | 10/2001 | Jones et al. | |
| 2002/0048224 A1 | 4/2002 | Dygert et al. | |
| 2009/0213418 A1* | 8/2009 | Kaneko | H04N 1/00344 358/1.15 |
| 2013/0159486 A1 | 6/2013 | Vasseur | |
| 2014/0204833 A1 | 7/2014 | Negishi et al. | |
| 2016/0065718 A1* | 3/2016 | Yamada | H04W 4/80 455/420 |

FOREIGN PATENT DOCUMENTS

| | | |
|---|---|---|
| JP | 2000-215653 A | 8/2000 |
| JP | 2005-506646 A | 3/2005 |
| JP | 2007-095306 A | 4/2007 |
| JP | 2014-127729 A | 7/2014 |
| JP | 2014-146123 A | 8/2014 |
| JP | 2015-507872 A | 3/2015 |
| JP | 2015-119457 A | 6/2015 |
| JP | 2016-006922 A | 1/2016 |

* cited by examiner

*Primary Examiner* — Andrew H Lam
(74) *Attorney, Agent, or Firm* — Sughrue Mion, PLLC

(57) ABSTRACT

Provided is an information processing system including a provided device information acquiring section that acquires provided device information which is information on a device provided in an office room, and an output section that outputs information on a service which is providable to a user in an office room, based on the provided device information acquired by the provided device information acquiring section.

15 Claims, 22 Drawing Sheets

FIG.7

CHECK MACHINE

IoT MANAGEMENT | MAIN BODY MANAGEMENT

SENSOR ▶ | ALL STATUSES ▶

UPDATE | RETRIEVE SERVICE WITH IDENTIFICATION INFORMATION ◀ ▽ 1 2 3 4 5 6 7 8 9 10 ▲ — 206

| NAME | CLASS | LOCATION | STATUS | DETECTION VALUE (UNIT) | Date | DETECTION INTERVAL | TYPE NUMBER | DETAILS |
|---|---|---|---|---|---|---|---|---|
| TEMPERATURE OF BULLETIN BOARD | TEMPERATURE SENSOR | IN VICINITY OF PILLAR 1 | NORMAL | 20.4(Celsius) | 2016/06/17 18:01 | 60 SECONDS | VDX-445HD | 🖱 ← 209 |
| TEMPERATURE OF WALL CLOCK | TEMPERATURE SENSOR | IN VICINITY OF WESTERN WINDOW | NORMAL | 19.2(Celsius) | 2016/06/17 18:00 | 60 SECONDS | VDX-445HD | ▪ |
| TEMPERATURE BEFORE HOT-WATER SUPPLY | TEMPERATURE SENSOR | IN THE VICINITY OF DOOR | NORMAL | 22.5(Celsius) | 2016/06/17 18:00 | 60 SECONDS | VDX-445HD | ▪ |
| TEMPERATURE IN THE VICINITY OF REFRIGERATOR | TEMPERATURE SENSOR | IN THE VICINITY OF EASTERN WALL | NORMAL | 23.5(Celsius) | 2016/06/17 18:01 | 60 SECONDS | VDX-445HD | ▪ |
| TEMPERATURE OF CEILING | TEMPERATURE SENSOR | AT THE CENTER OF CEILING | NORMAL | 22.4(Celsius) | 2016/06/17 18:00 | 60 SECONDS | VDX-445HD | ▪ |
| HUMIDITY OF BULLETIN BOARD | HUMIDITY SENSOR | IN THE VICINITY OF PILLAR 1 | NORMAL | 42.3(%RH) | 2016/06/17 18:01 | 60 SECONDS | APM-225T | ▪ |
| HUMIDITY OF WALL CLOCK | HUMIDITY SENSOR | IN VICINITY OF WESTERN WINDOW | NORMAL | 40.6(%RH) | 2016/06/17 18:00 | 60 SECONDS | APM-225T | ▪ |
| HUMIDITY BEFORE HOT-WATER SUPPLY | HUMIDITY SENSOR | IN THE VICINITY OF DOOR | NORMAL | 46.1(%RH) | 2016/06/17 18:01 | 60 SECONDS | APM-225T | ▪ |
| HUMIDITY IN THE VICINITY OF REFRIGERATOR | HUMIDITY SENSOR | IN THE VICINITY OF EASTERN WALL | NORMAL | 41.3(%RH) | 2016/06/17 18:01 | 60 SECONDS | APM-225T | ▪ |
| HUMIDITY OF CEILING | HUMIDITY SENSOR | AT THE CENTER OF CEILING | NORMAL | 40.2(%RH) | 2016/06/17 18:00 | 60 SECONDS | APM-225T | ▪ |
| NOISE ON RECEPTION TABLE | NOISE SENSOR | IN THE VICINITY OF RECEPTION TABLE | NORMAL | 24(dB) | 2016/06/17 18:00 | 60 SECONDS | SND-9897DEX | ▪ |
| NOISE OF AIR CONDITIONER | NOISE SENSOR | BELOW AIR CONDITIONER | NORMAL | 44(dB) | 2016/06/17 18:00 | 60 SECONDS | VDX-445HD | ▪ |

12 CASES DISPLAYED ▶   ◀ ▽ 1 2 3 4 5 6 7 8 9 10 ▲

UPDATE                                              RETURN

CHECK MACHINE — 206

| IoT MANAGEMENT | MAIN BODY MANAGEMENT |

SENSOR ▶ ALL STATUSES ▶

UPDATE | RETRIEVE SERVICE WITH IDENTIFICATION INFORMATION

| NAME | CLASS | LOCATION | STATUS | DETECTION VALUE (UNIT) | Date | DETECTION INTERVAL | TYPE NUMBER | DETAILS |
|---|---|---|---|---|---|---|---|---|
| TEMPERATURE OF BULLETIN BOARD | TEMPERATURE SENSOR | IN VICINITY OF PILLAR 1 | NORMAL | 20.4(Celsius) | 2016/06/17 18:01 | 60 SECONDS | VDX-445HD | |
| TEMPERATURE OF WALL CLOCK | TEMPERATURE SENSOR | IN VICINITY OF WESTERN WINDOW | NORMAL | 19.2(Celsius) | 2016/06/17 18:00 | 60 SECONDS | VDX-445HD | |
| TEMPERATURE BEFORE HOT-WATER SUPPLY | TEMPERATURE SENSOR | IN THE VICINITY OF DOOR | NORMAL | 22.5(Celsius) | 2016/06/17 18:00 | 60 SECONDS | VDX-445HD | |
| TEMPERATURE IN THE VICINITY OF REFRIGERATOR | TEMPERATURE SENSOR | IN THE VICINITY OF EASTERN WALL | NORMAL | 23.5(Celsius) | 2016/06/17 18:01 | 60 SECONDS | VDX-445HD | |
| TEMPERATURE OF CEILING | TEMPERATURE SENSOR | AT THE CENTER OF CEILING | NORMAL | 22.4(Celsius) | 2016/06/17 18:00 | 60 SECONDS | VDX-445HD | |
| HUMIDITY OF BULLETIN BOARD | HUMIDITY SENSOR | IN THE VICINITY OF PILLAR 1 | NORMAL | 42.3(%RH) | 2016/06/17 18:00 | 60 SECONDS | APM-225T | |
| HUMIDITY OF WALL CLOCK | HUMIDITY SENSOR | IN VICINITY OF WESTERN WINDOW | NORMAL | 40.6(%RH) | 2016/06/17 18:00 | 60 SECONDS | APM-225T | |
| HUMIDITY BEFORE HOT-WATER SUPPLY | HUMIDITY SENSOR | IN THE VICINITY OF DOOR | NORMAL | 46.1(%RH) | 2016/06/17 18:01 | 60 SECONDS | APM-225T | |
| HUMIDITY IN THE VICINITY OF REFRIGERATOR | HUMIDITY SENSOR | IN THE VICINITY OF EASTERN WALL | NORMAL | 41.3(%RH) | 2016/06/17 18:01 | 60 SECONDS | APM-225T | |
| HUMIDITY OF CEILING | HUMIDITY SENSOR | AT THE CENTER OF CEILING | NORMAL | 40.2(%RH) | 2016/06/17 18:00 | 60 SECONDS | APM-225T | |
| NOISE ON RECEPTION TABLE | NOISE SENSOR | IN THE VICINITY OF RECEPTION TABLE | NORMAL | 24(dB) | 2016/06/17 18:00 | 60 SECONDS | SND-9897DEX | |
| NOISE OF AIR CONDITIONER | NOISE SENSOR | BELOW AIR CONDITIONER | NORMAL | 44(dB) | 2016/06/17 18:00 | 60 SECONDS | VDX-445HD | |

12 CASES DISPLAYED ▶    1 2 3 4 5 6 7 8 9 10

UPDATE    RETURN

FIG.17

SERVICE RETRIEVAL RESULT

DEVICE NAME: DESKTOP PERSON SENSOR – JINKANKUN
CLASS: PERSON SENSOR
TYPE NUMBER: VMD-4467ED
Vender: Office Monitoring Inc.

USABLE SERVICE:

| SERVICE NAME | VENDOR | ADDABLE FACILITY | DETAILS |
|---|---|---|---|
| FUJI OFFICE AIR-CONDITIONING SERVICE | FUJI CO., LTD. | NONE (USABLE ONLY BY CURRENT FACILITY) | |
| FLOOR CLEANING SERVICE | RoBBO., LTD. | DUSTER ROBOT CLEANER (VDF-223RF) | |
| LIGHTING CONTROL SERVICE | UMIGIWA LIGHTING CO. LTD. | ZIGBEE CORRESPONDING LIGHTING DEVICE | |
| FUJI PLEASANT OFFICE SERVICE | FUJI CO., LTD. | NONE (USABLE ONLY BY CURRENT FACILITY) | |
| FUJI ENTERING/EXIT MONITORING SERVICE | FUJI CO., LTD. | NONE (USABLE ONLY BY CURRENT FACILITY) | |
| FUJI ENERGY SAVE SERVICE | FUJI CO., LTD. | NONE (USABLE ONLY BY CURRENT FACILITY) | |
| FUJI IoT DEVICE MANAGEMENT SERVICE | SEKKOMM | OPENING/CLOSING SENSOR (GRD-76F,····) | |
| AUTO LOCK SERVICE | SEKKOMM | REMOTE LOCKING DEVICE (FFD1276EX,····) | |

DETAILS OF SKIN ROUGHNESS AND DRYNESS PREVENTING SERVICE

SERVICE NAME: SKIN ROUGHNESS AND DRYNESS PREVENTING SERVICE
VENDER: OHADANOKENKOSHA

LIST OF ADDABLE FACILITIES:

| COMMENTS | FACILITY NAME | PURCHASE SITE |
|---|---|---|
| REMOVING MICROORGANISM IN OFFICE BY ADDING ION GENERATING DEVICE | ION GENERATING DEVICE | ○○○ SHOPPING SITE |
| MAKING OFFICE PLEASANT WITH PLASMA ION GENERATOR! | PLASMA ION GENERATOR | FUJI OFFICE SERVICE |
| RECOMMENDATION BY FUJI CO., LTD.!, ANION GENERATING DEVICE | ANION GENERATING DEVICE | FUJI DIRECT |
| SHUTTING OUT PM 2.5, AND SHUTTING OUT POLLEN WITH THIS | DUSTPROOF FILTER | MAKER DIRECT SALE SITE |

SERVICE LIST — 206

| SERVICE NAME | VENDOR | DETAILS |
|---|---|---|
| FUJI OFFICE AIR-CONDITIONING SERVICE | FUJI CO., LTD. | i — 209 |
| FLOOR CLEANING SERVICE | ROBBO CO., LTD. | i |
| LIGHTING CONTROL SERVICE | UMIGIWA LIGHTING CO. LTD. | i |
| FUJI PLEASANT OFFICE SERVICE | FUJI CO., LTD. | i |
| FUJI ENTERING/EXIT MONITORING SERVICE | FUJI CO., LTD. | i |
| FUJI ENERGY SAVE SERVICE | FUJI CO., LTD. | i |
| FUJI IoT DEVICE MANAGEMENT SERVICE | FUJI CO., LTD. | i |
| OFFICE SECURITY SERVICE | SEKKOMM | |
| AUTO LOCK SERVICE | SEKKOMM | |

OK

INFORMATION PROCESSING APPARATUS CONFIGURED TO NOTIFY ABOUT A SERVICE

CROSS-REFERENCE TO RELATED APPLICATIONS

This application is based on and claims priority under 35 USC 119 from Japanese Patent Application No. 2016-171629 filed Sep. 2, 2016.

BACKGROUND

Technical Field

The present invention relates to an information processing apparatus.

SUMMARY

According to an aspect of the invention, there is provided an information processing system including:

a provided device information acquiring section that acquires provided device information which is information on a device provided in an office room; and an output section that outputs information on a service which is providable to a user in an office room, based on the provided device information acquired by the provided device information acquiring section.

BRIEF DESCRIPTION OF THE DRAWINGS

Exemplary embodiments of the present invention will be described in detail based on the following figures, wherein:

FIG. 3 is a diagram illustrating each functioning unit implemented by a CPU of the image forming apparatus, and the like;

FIG. 7 is a diagram illustrating the display screen in the UI after a selection item of "Check Machine" is selected;

FIG. 12 is a diagram illustrating the display screen when the display screen of the UI is switched to the display screen displaying information on a service;

FIG. 14 is a diagram for describing an example of a processing executed in the office environment management system;

FIG. 17 is a diagram for describing an example of a processing executed in the office environment management system;

FIG. 21 is a diagram for describing another example of the processing executed in the office environment management system; and FIG. 22 is a diagram illustrating another example of the display screen in the UI.

DETAILED DESCRIPTION

Hereinafter, exemplary embodiments of the present invention will be described with reference to the accompanying drawings.

Figure 1:
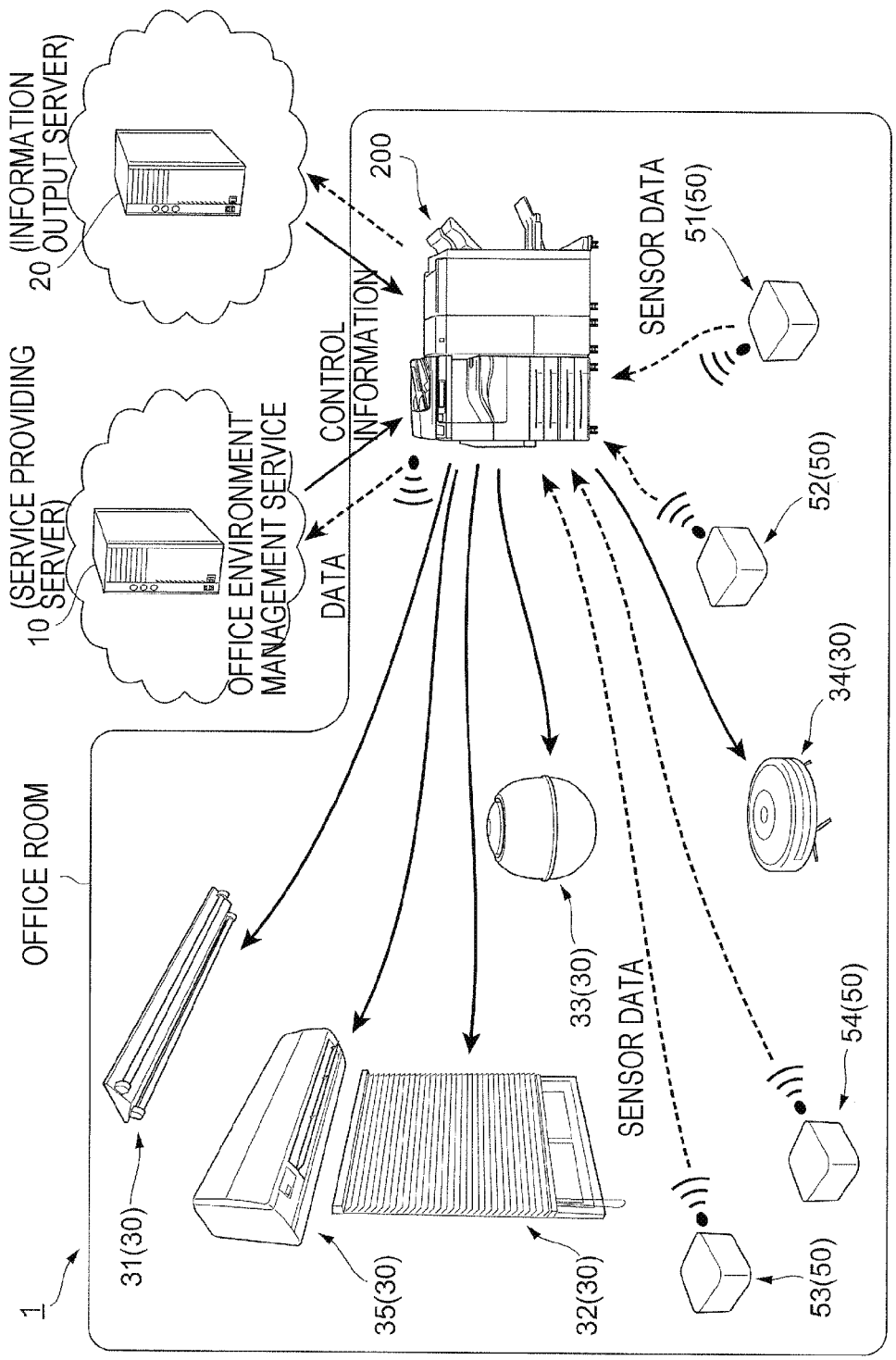
FIG. 1 is a diagram illustrating an entire configuration of an office environment management system.

FIG. 1 is a diagram illustrating an entire configuration of an office environment management system 1.

In the office environment management system 1 as an example of an information processing system, a service providing server 10 is provided on a cloud. Meanwhile, in FIG. 1, only one service providing server 10 is illustrated, but plural service providing servers 10 is provided according to the number of providers of a service.

In the office environment management system 1 of the exemplary embodiment, similarly, an information output server 20 is provided on the cloud as an example of an external device. The information output server 20 outputs information regarding the service which is providable to a user in an office room or outputs information on a device required for providing the service.

In the office environment management system 1, an image forming apparatus 200 is provided, which is connected to the service providing server 10 and the information output server 20 to serve as a gateway or an edge server.

The image forming apparatus 200 as an example of an information processing apparatus is provided in the office room (in an office) where the user performs work. The image forming apparatus 200 has a FAX function or scanner function in addition to a function of forming an image on recording media including a sheet, and the like.

In the office environment management system 1, an actuator (controlled device) 30 and a sensor 50 are provided as an example of the device. The actuator 30 and the sensor 50 are also provided in the office room.

The actuator 30 is connected to the service providing server 10 through the image forming apparatus 200 to be controlled by the service providing server 10.

Plural sensors 50 are provided in the office room to determine surrounding situations thereof, respectively. In addition, the sensor 50 outputs information on the determined surrounding situations to the image forming apparatus 200.

The image forming apparatus 200 outputs the information on the surrounding situations to the service providing server 10. The service providing server 10 controls the actuator 30 based on the information (information acquired by the sensor 50) transmitted from the image forming apparatus 200.

The actuator 30 communicates with the image forming apparatus 200 to receive a control signal (a control signal transmitted from the service providing server 10 through the image forming apparatus 200) from the image forming apparatus 200.

In the exemplary embodiment, as the actuator 30, a lighting device 31, a blind device 32, a humidifier 33, a cleaning device 34, and an air control device 35 are provided.

The lighting device 31 has a light source and turns on or off the light source according to a control signal from the service providing server 10.

The blind device 32 has a blind and a driving mechanism changing a state of the blind and changes the state of the blind according to the control signal from the service providing server 10. As a result, an external light amount which enters the office room is changed.

The humidifier 33 has a mechanism that evaporates water and humidifies the inside of the office room according to the control signal from the service providing server 10.

The cleaning device 34 has a sucking mechanism that sucks waste in the office and collects the waste in the office room by moving in the office room according to the control signal from the service providing server 10.

The air control device 35 has a heating source, and the like and controls an air adjustment in the office according to the control signal from the service providing server 10.

In the exemplary embodiment, as the sensors 50, a temperature sensor 51 measuring a temperature, a humidity sensor 52 measuring humidity, and an illumination sensor 53 measuring illuminance are provided. Further, a person sensor 54 is provided, which includes an infrared sensor, and the like to detect a person in the office room.

Each of the sensors 50 transmits information (hereinafter, may be called "situational information") acquired by using wireless or wired communication (through communication with the image forming apparatus 200) to the image forming apparatus 200.

The image forming apparatus 200 transmits the situational information from the sensor 50 to the service providing server 10.

In the office environment management system 1, control information used for controlling the actuator 30 is transmitted to the image forming apparatus 200 from the service providing server 10. In addition, the image forming apparatus 200 transmits the control information to the actuator 30 corresponding thereto.

Figure 2:
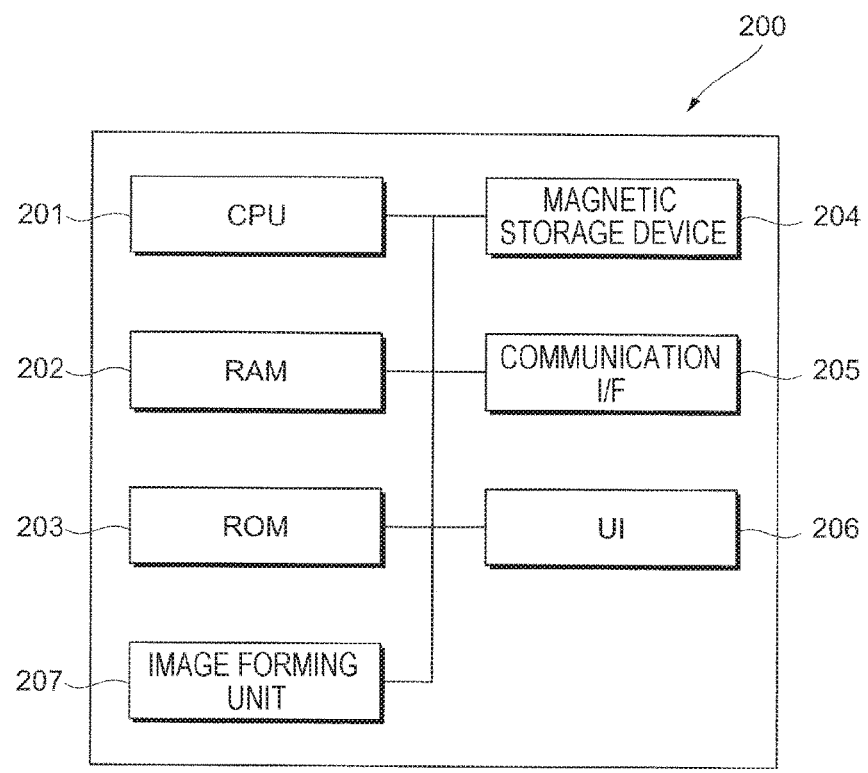
FIG. 2 is a diagram illustrating a hardware configuration of an image forming apparatus.

FIG. 2 is a diagram illustrating a hardware configuration of an image forming apparatus 200.

As illustrated in FIG. 2, the image forming apparatus 200 includes a central processing unit (CPU) 201, a random access memory (RAM) 202, a read only memory (ROM) 203, and a magnetic storage device 204. Further, the image forming apparatus 200 has a communication interface (I/F) 205 for communication with the outside.

The image forming apparatus 200 includes a user interface (UI) 206 and an image forming unit 207.

The UI 206 includes, for example, a touch panel type display and receives information to be displayed to display (notify) the information to a user. Further, the UI 206 receives an operation from the user.

The image forming unit 207 as an example of an image forming section forms an image in a sheet which is an example of a recording medium by using an electrophotographic system or an inkjet head system.

The ROM 203 and the magnetic storage device 204 store a program executed by the CPU 201. The CPU 201 reads the program stored in the ROM 203 or the magnetic storage device 204 and executes the program by using the RAM 202 as a working area.

Figure 3:
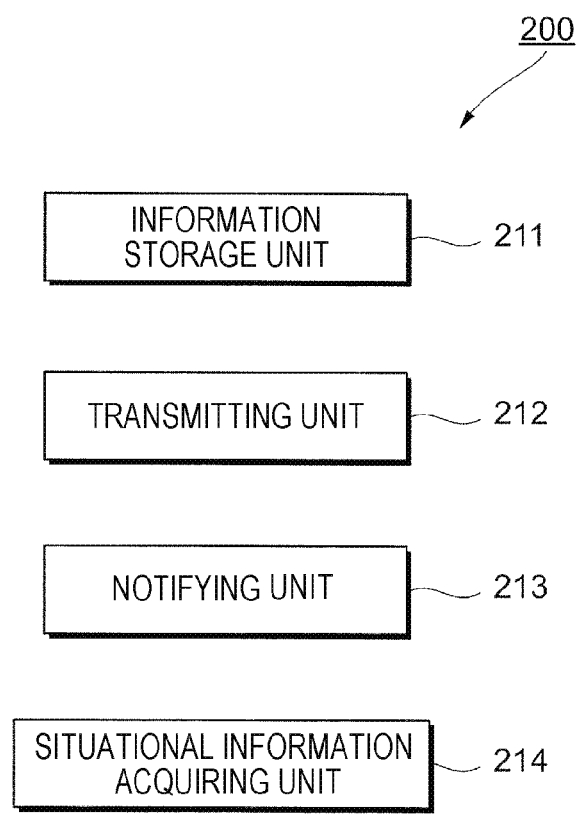

The program stored in the ROM 203 or the magnetic storage device 204 is executed by the CPU 201, and as a result, each functioning unit (described below) illustrated in FIG. 3 is realized.

Herein, the program executed by the CPU 201 may be provided to the image forming apparatus 200 while being stored in computer-readable recording media including magnetic recording media (a magnetic tape, a magnetic disk, and the like), optical recording media (an optical disc, and the like), magneto-optic recording medium, a semiconductor memory, and the like. Further, the program executed by the CPU 201 may be downloaded to the image forming apparatus 200 by using a communication section such as the Internet.

FIG. 3 is a diagram illustrating each functioning unit implemented by a CPU 201 of the image forming apparatus 200, and the like.

An information storage unit 211 storing provided device information which is information on a device provided in the office room is provided in the image forming apparatus 200. The information storage unit 211 as an example of an information storage section includes, for example, the program-controlled CPU 201 and a magnetic storage device 204.

A transmitting unit 212 is provided in the image forming apparatus 200. The transmitting unit 212 as an example of a transmitting section transmits the provided device information stored by the information storage unit 211 to the outside. Further, the transmitting unit 212 transmits the situational information acquired by a situational information acquiring unit 214 to be described below to the outside. The transmitting unit 212 includes, for example, the program-controlled CPU 201 and a communication I/F 205.

The image forming apparatus 200 includes a notifying unit 213. The notifying unit 213 includes, for example, the program-controlled CPU 201 and the UI 206 and receives information to be notified (displayed) by the user to notify (display) the user of the information.

The image forming apparatus 200 has the situational information acquiring unit 214. The situational information acquiring unit 214 as an example of a situational information acquiring section includes, for example, the program-controlled CPU 201 and acquires the situational information which is information regarding a situation in the office room.

More specifically, in the exemplary embodiment, the information regarding the situation in the office room is acquired by the sensor 50. The situational information acquiring unit 214 acquires the information from the sensor 50 as the situational information. Further, the situational information acquiring unit 214 acquires the situational information based on information which the user inputs through the UI 206.

Figure 4:
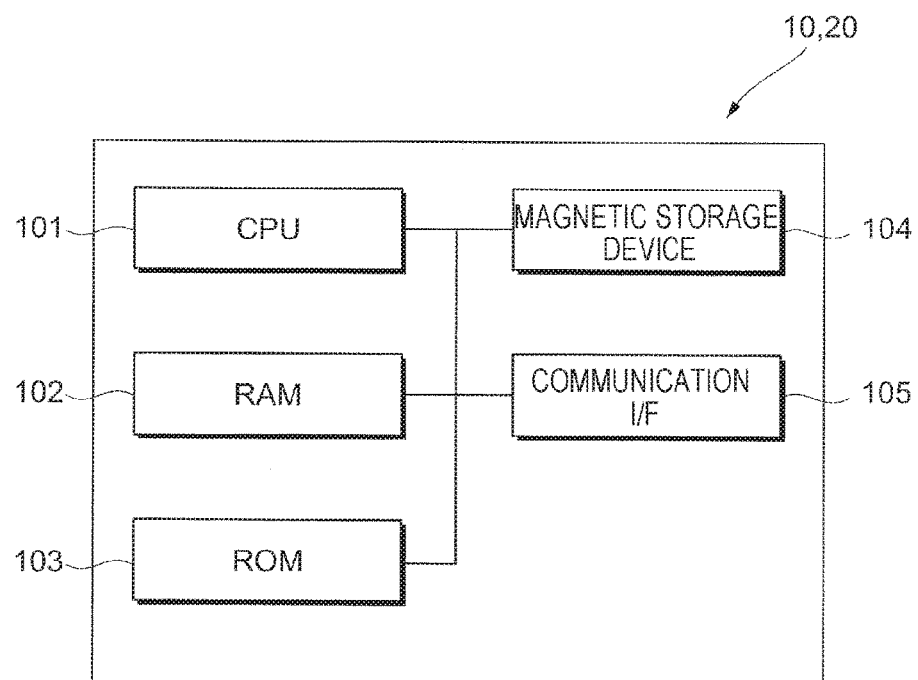
FIG. 4 is a diagram illustrating hardware configurations of a service providing server and an information output server.

FIG. 4 is a diagram illustrating hardware configurations of a service providing server 10 and an information output server 20.

As illustrated in FIG. 4, the service providing server 10 and the information output server 20 include the central processing unit (CPU) 101, the random access memory (RAM) 102, the read only memory (ROM) 103, and the magnetic storage device 104. Further, the service providing server 10 and the information output server 20 have the communication interface (I/F) 105 for communication with the outside. The program stored in the ROM 103 or the magnetic storage device 104 is executed by the CPU 101, and as a result, each functioning unit illustrated in FIG. 5 is realized.

Figure 5:
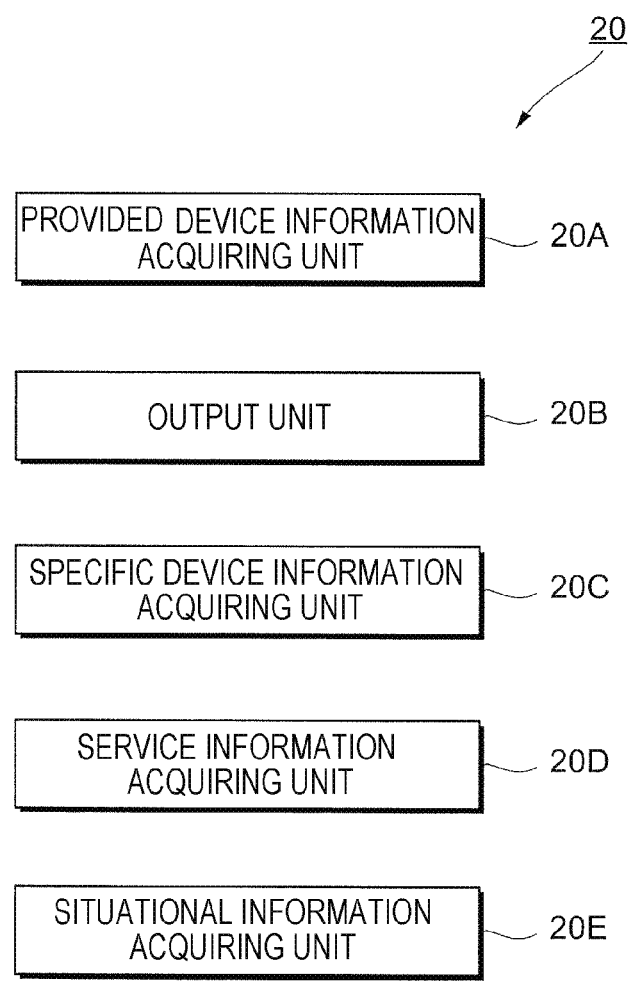
FIG. 5 is a functional block diagram illustrating a function of the information output server.

FIG. 5 is a functional block diagram illustrating a function of the information output server 20.

As illustrated in FIG. 5, the information output server 20 has a provided device information acquiring unit 20A.

The provided device information acquiring unit 20A as an example of a provided device information acquiring section acquires the provided device information which is the information on the device provided in the office room. More specifically, the provided device information acquiring unit 20A receives the provided device information transmitted from the image forming apparatus 200 to acquire the provided device information.

The information output server 20 includes an output unit 20B serving as an output section.

The output unit 20B outputs information on a service which is providable to the user in the office room based on the provided device information acquired by the provided device information acquiring unit 20A. Further, the output unit 20B outputs the information on the device required for providing the service.

The information output server 20 includes a specific device information acquiring unit 20C as an example of a specific device information acquiring section. The specific device information acquiring unit 20C acquires specific device information which is information on a device specified by the user.

Herein, in the exemplary embodiment, when the specific device information acquiring unit 20C acquires the specific device information, the output unit 20B outputs the information on the service which is providable to the user based on the provided device information acquired by the provided device information acquiring unit 20A and the specific device information acquired by the specific device information acquiring unit 20C.

The information output server 20 includes a service information acquiring unit 20D as an example of a service information acquiring section. The service information acquiring unit 20D acquires the information on the service which is providable to the user in the office room.

In the exemplary embodiment, when the service information acquiring unit 20D acquires the information on the service, the output unit 20B outputs the information on the device required for providing the service based on the information on the service acquired by the service information acquiring unit 20D and the provided device information acquired by the provided device information acquiring unit 20A.

The information output server 20 includes a situational information acquiring unit 20E as an example of a situational information acquiring section.

The situational information acquiring unit 20E receives and acquires the situational information (the situational information acquired by the sensor 50 in the office room) transmitted from the image forming apparatus 200.

When the situational information acquiring unit 20E acquires the situational information, the output unit 20B outputs the information on the service which is providable to the user in the office room based on the situational information acquired by the situational information acquiring unit 20E and the provided device information acquired by the provided device information acquiring unit 20A. Further, in this case, the output unit 20B outputs the information on the device required for providing the service.

Figure 6:
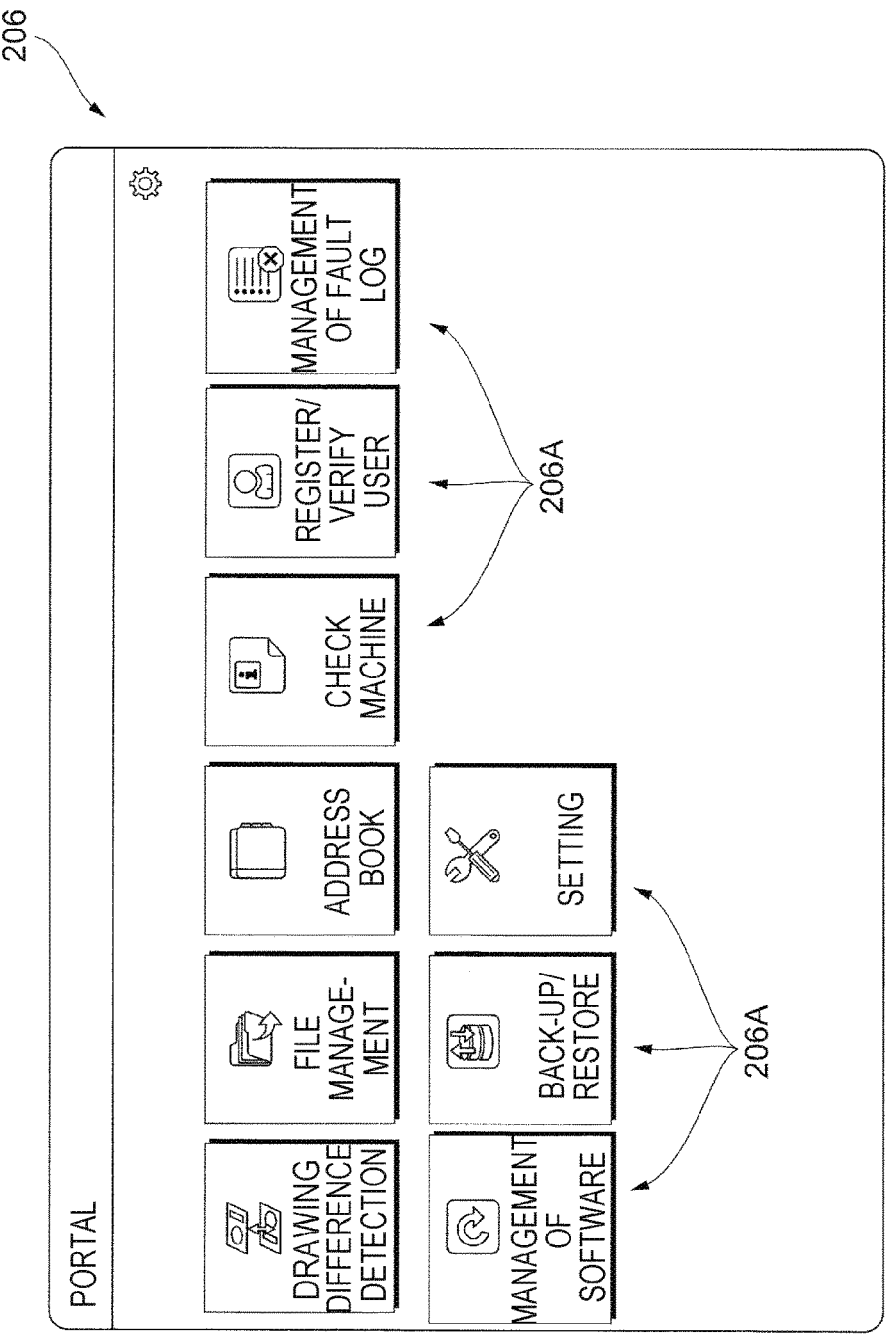
FIG. 6 is a diagram illustrating an example of a display screen in a UI of the image forming apparatus.

FIG. 6 is a diagram illustrating an example of a display screen in a UI 206 of the image forming apparatus 200.

In the image forming apparatus 200, plural selection items (selection buttons) 206A are displayed on the display screen in the UI 206 as illustrated in FIG. 6. In the exemplary embodiment, the selection item 206A is selected by the user, and as a result, a processing corresponding to the selection item 206A is executed.

In the exemplary embodiment, among the plural selection items 206A, a selection item 206A called "Check Machine" is included, and hereinafter, a processing when the selection item 206A of "Check Machine" is selected will be described.

FIG. 7 is a diagram illustrating the display screen in the UI 206 after a selection item 206A of "Check Machine" is selected.

In the exemplary embodiment, when the selection item 206A of "Check Machine" is selected, a list of the sensors 50 provided in the office room is displayed as illustrated in FIG. 7. In other words, the information on the sensor 50 stored in the information storage unit 211 (see FIG. 3) of the image forming apparatus 200 is displayed.

Herein, in the exemplary embodiment, when a device such as a new sensor 50 or actuator 30 is provided in the office room, information on the device is, for example, registered in the image forming apparatus 200 through the UI 206.

The list of the sensors 50 registered in the image forming apparatus 200 is displayed on the display screen illustrated in FIG. 7.

On the display screen illustrated in FIG. 7, a name, a class, a provision location, a state, a detection value, a recent detection date, a detection interval, and a type number of each sensor 50 are displayed.

A selection button (hereinafter, referred to as "detail button 209") selected by the user when the user verifies details of each sensor 50 is displayed at a right end of the display screen.

Figure 8:
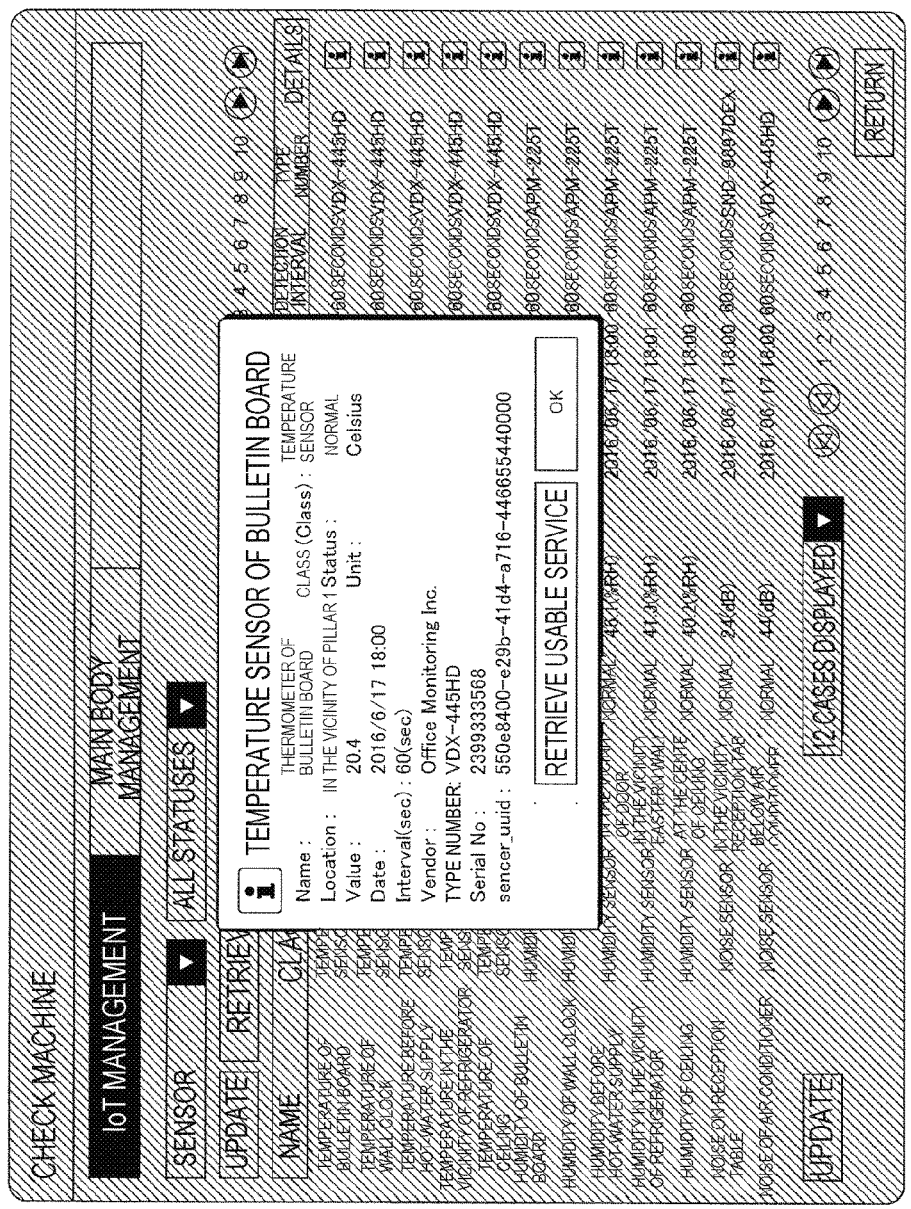
FIG. 8 is a diagram illustrating the display screen after a detail button displayed at a first row in FIG. 7 is selected by a user.

FIG. 8 is a diagram illustrating the display screen after a detail button 209 displayed at a first row in FIG. 7 is selected by a user.

When the detail button 209 is selected (pressed), the name, the class, the provision location, the status, the detection value, the unit, the detection date, the detection interval, and the type number of the selected sensor 50 are displayed on the display screen as illustrated in FIG. 8. Further, a vendor providing the sensor 50, a serial No. of the sensor 50, a universally unique identifier (UUID), and the like are displayed.

The user may determine the details of the sensor 50 provided in the office room by referring to the display screen.

Figure 9:
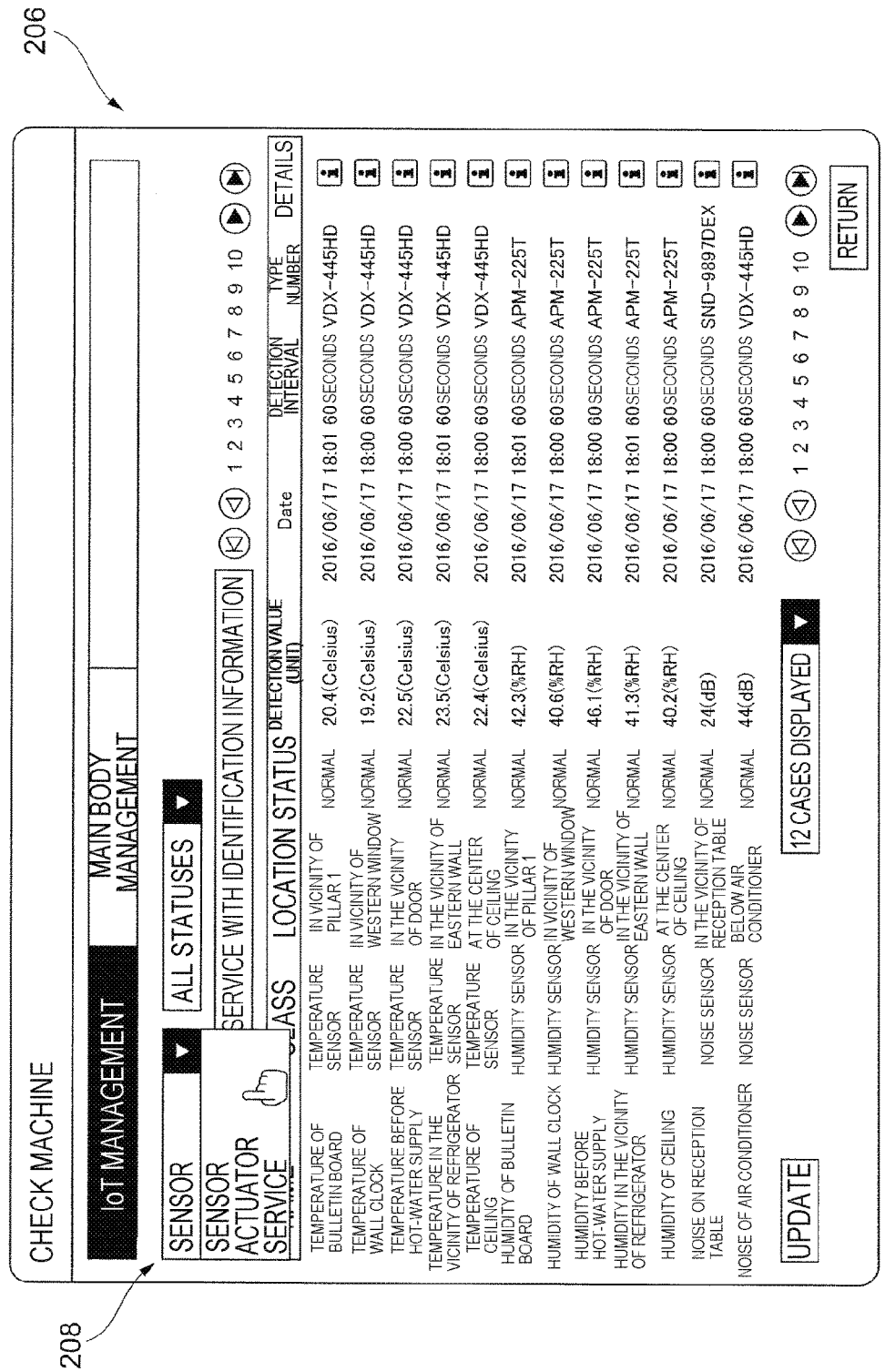
FIG. 9 is a diagram illustrating the display screen when the display screen of the UI is switched to the display screen displaying information on an actuator.

FIG. 9 is a diagram illustrating the display screen when the display screen of the UI 206 is switched to the display screen displaying information on an actuator 30.

On the display screen of the exemplary embodiment, a pull-down menu 208 for switching the display screen is provided at an upper left side of the display screen and when the user selects a part called "actuator" displayed when the user operates the pull-down menu 208, the display screen of the UI 206 is switched to the display screen displaying the information on the actuator 30.

Figure 10:
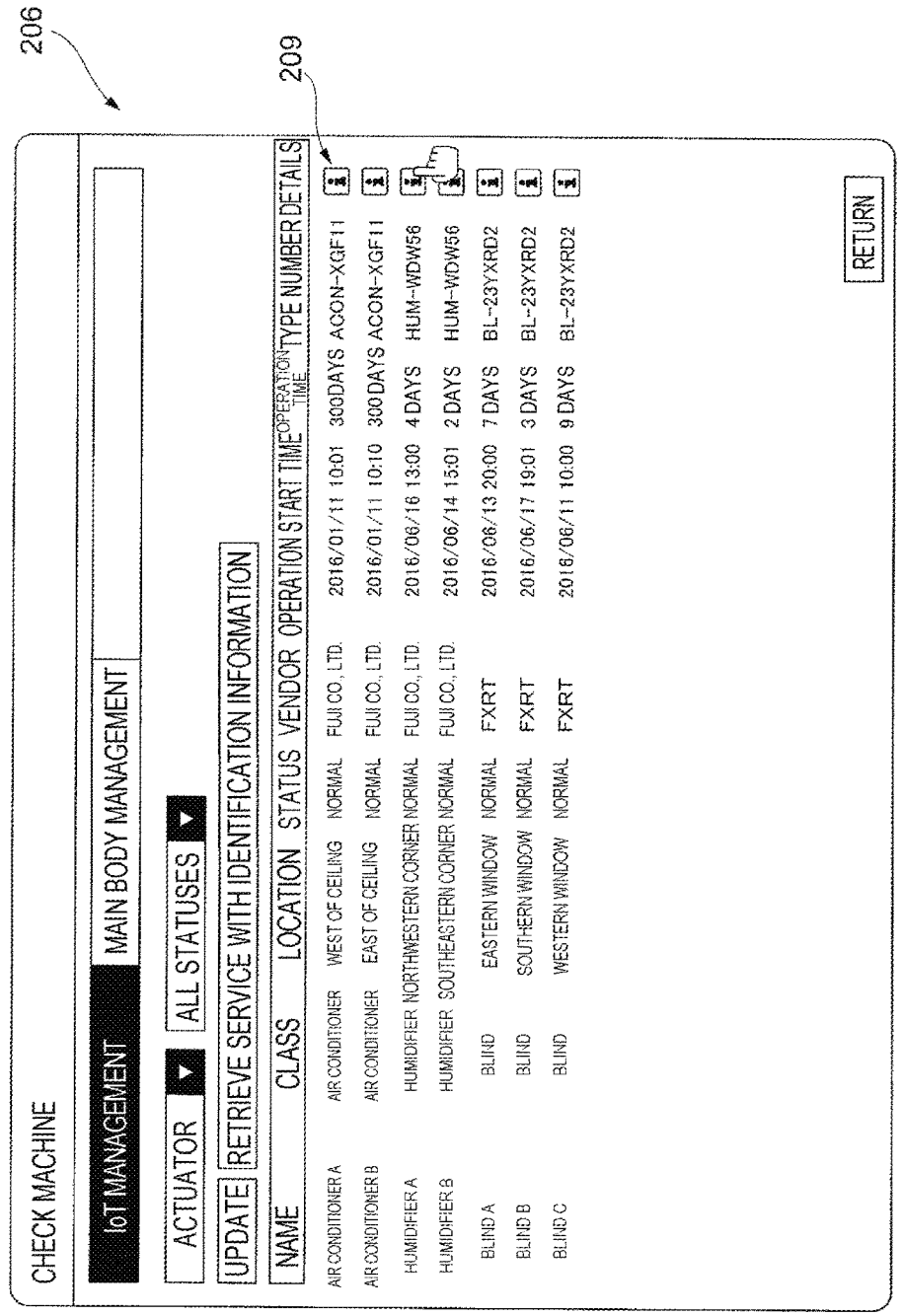
FIG. 10 is a diagram illustrating the display screen after being switched to the display screen displaying the information on the actuator.

FIG. 10 is a diagram illustrating the display screen after being switched to the display screen displaying the information on the actuator 30.

As illustrated in FIG. 10, on the display screen displaying the information on the actuator 30, a list of actuators 30 (actuators 30 provided in the office room) registered in the image forming apparatus 200 is displayed.

Specifically, the name, the class, the provision location, the status, the vendor, an operation start time, an operation time, and the type number of the actuator 30 are displayed. Further, a detail button 209 selected by the user when the user verifies details of each actuator 30 is displayed at the right end of the display screen.

The user may verify the actuator 30 provided in the office room by referring to the display screen.

Figure 11:
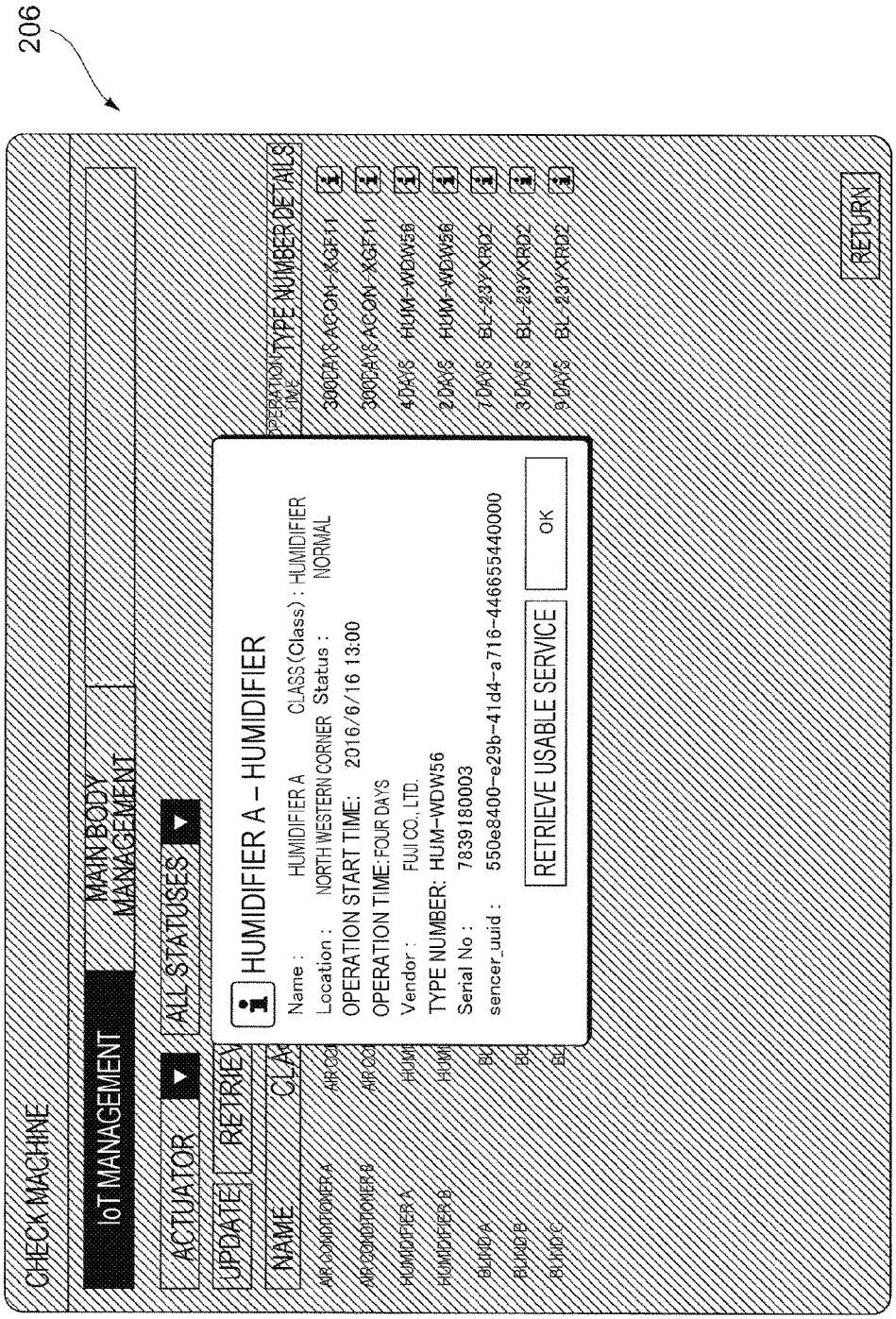
FIG. 11 is a diagram illustrating the display screen after the detail button displayed at a third row in FIG. 10 is selected by the user.

FIG. 11 is a diagram illustrating the display screen after the detail button 209 displayed at a third row in FIG. 10 is selected by the user.

When the detail button 209 is pressed, the name, the class, the provision location, the status, the operation start time, the operation time, the vendor, the type number, the serial No., the universally unique identifier (UUID), and the like of the actuator 30 are displayed on the display screen as illustrated in FIG. 11.

The user may determine the details of the actuator 30 provided in the office room by referring to the display screen.

Figure 12:
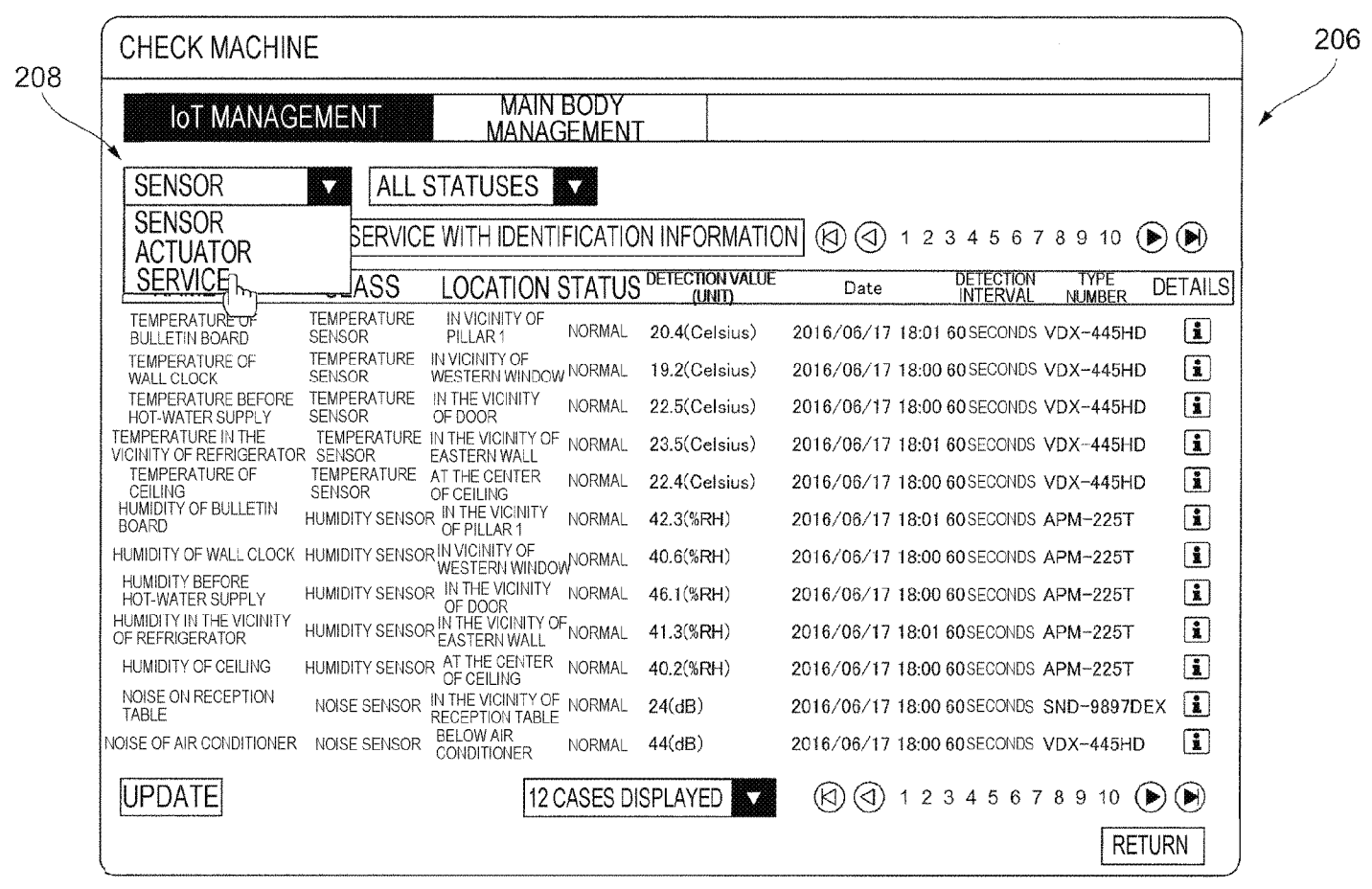

FIG. 12 is a diagram illustrating the display screen when the display screen of the UI 206 is switched to the display screen displaying information on a service.

As described above, in the exemplary embodiment, the pull-down menu 208 for switching the display screen is provided at the upper left side of the display screen and when the user selects a part called "service" displayed when the user operates the pull-down menu 208, information regarding a service (a service provided by a service provider) provided to the user in the office room is displayed.

Figure 13:
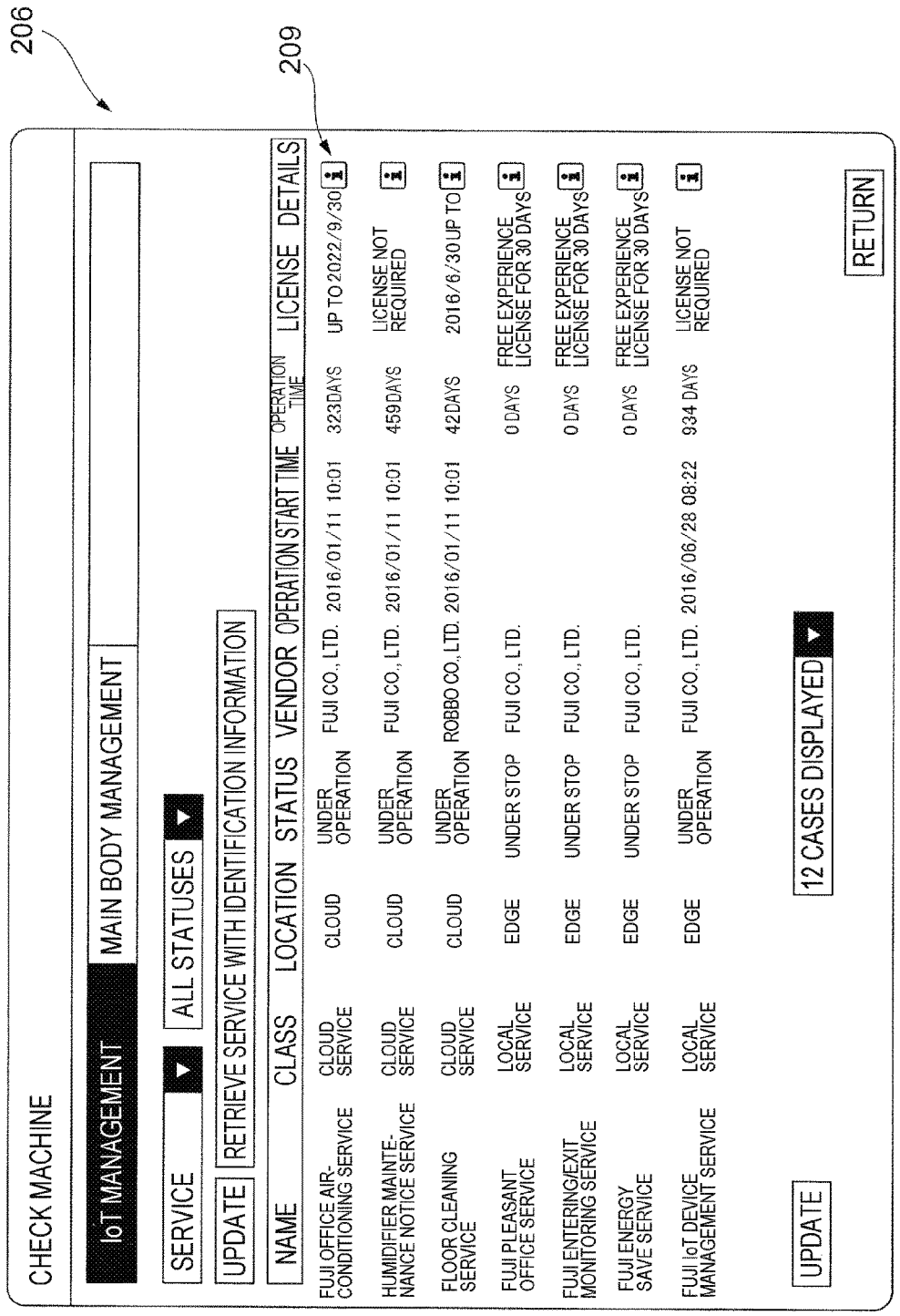
FIG. 13 is a diagram illustrating the display screen after being switched to the display screen displaying the information on the service.

FIG. 13 is a diagram illustrating the display screen after being switched to the display screen displaying the information on the service.

On the display screen displaying the information regarding the service, the list of the services provided to the user in the office room is displayed.

Specifically, the name, the class, the location (information indicating whether a providing agent of the service exists on a cloud or local portion), and the status of the service, the vendor of the service, the operation start time, the operation time, and information on a license are displayed. Further, the detail button 209 selected by the user when the user verifies the details of each service is displayed at the right end of the display screen.

The user may verify the list of the services provided into the office room through the image forming apparatus 200 by referring to the display screen.

FIGS. 14 to 17 are diagrams for describing an example of a processing executed in the office environment management system 1 of the exemplary embodiment.

As illustrated in FIG. 14, on the display screen of the exemplary embodiment, a selection button called "retrieve a service with identification information" is additionally displayed. In addition, when the selection button is selected by the user, a new service which is providable to the user in the office room is retrieved and output and information on the new service is notified by the user through the UI 206 of the image forming apparatus 200, in the information output server 20 (see FIG. 1). Hereinafter, the notifying processing will be described in detail.

Figure 15:
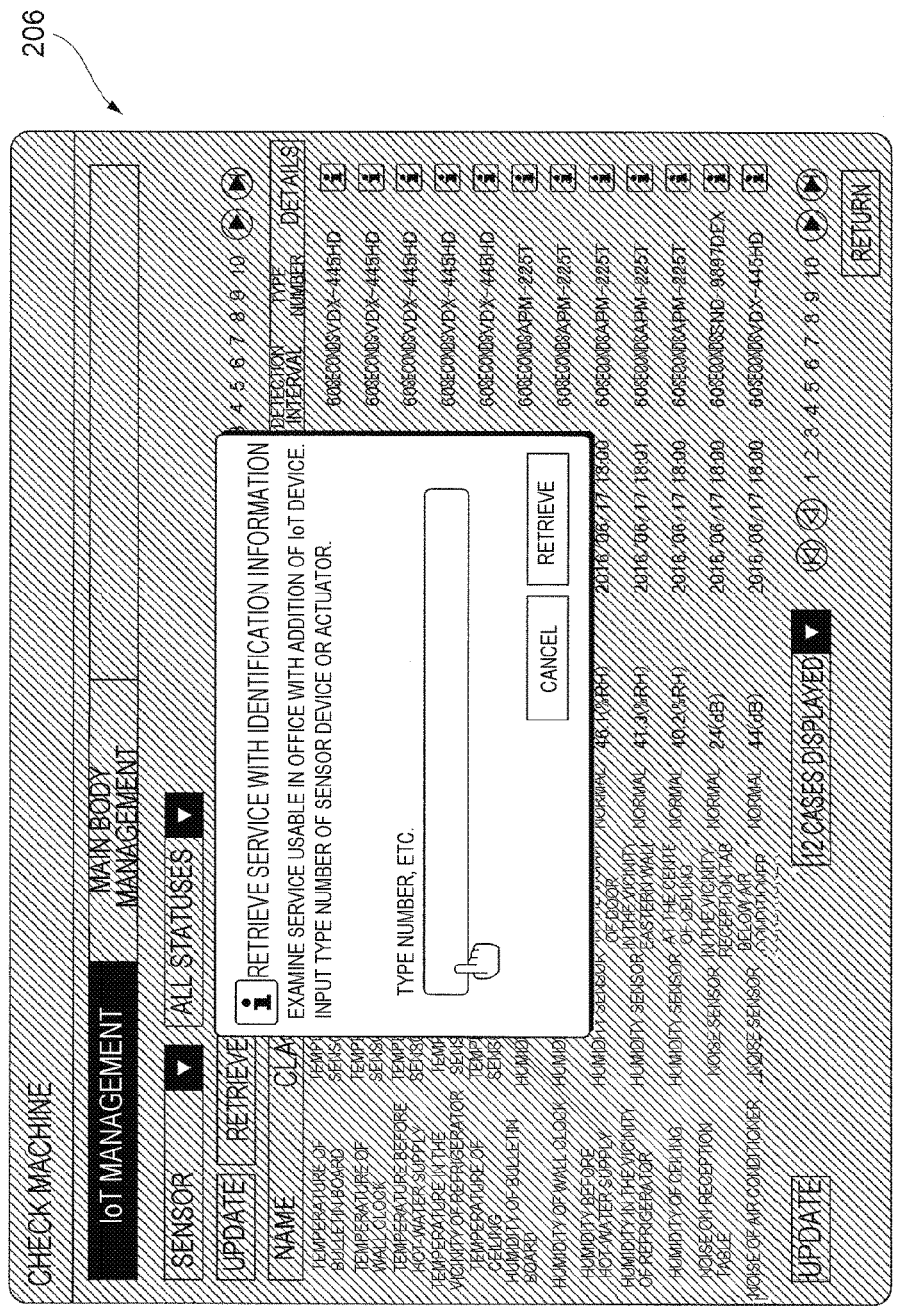
FIG. 15 is a diagram for describing an example of a processing executed in the office environment management system.

When the selection button called "retrieve a service with identification information" is selected by the user, the display screen is switched to a display screen illustrated in FIG. 15. A box (frame) for inputting the type number of the sensor 50 or the type number of the actuator 30 is displayed on the display screen.

Figure 16:
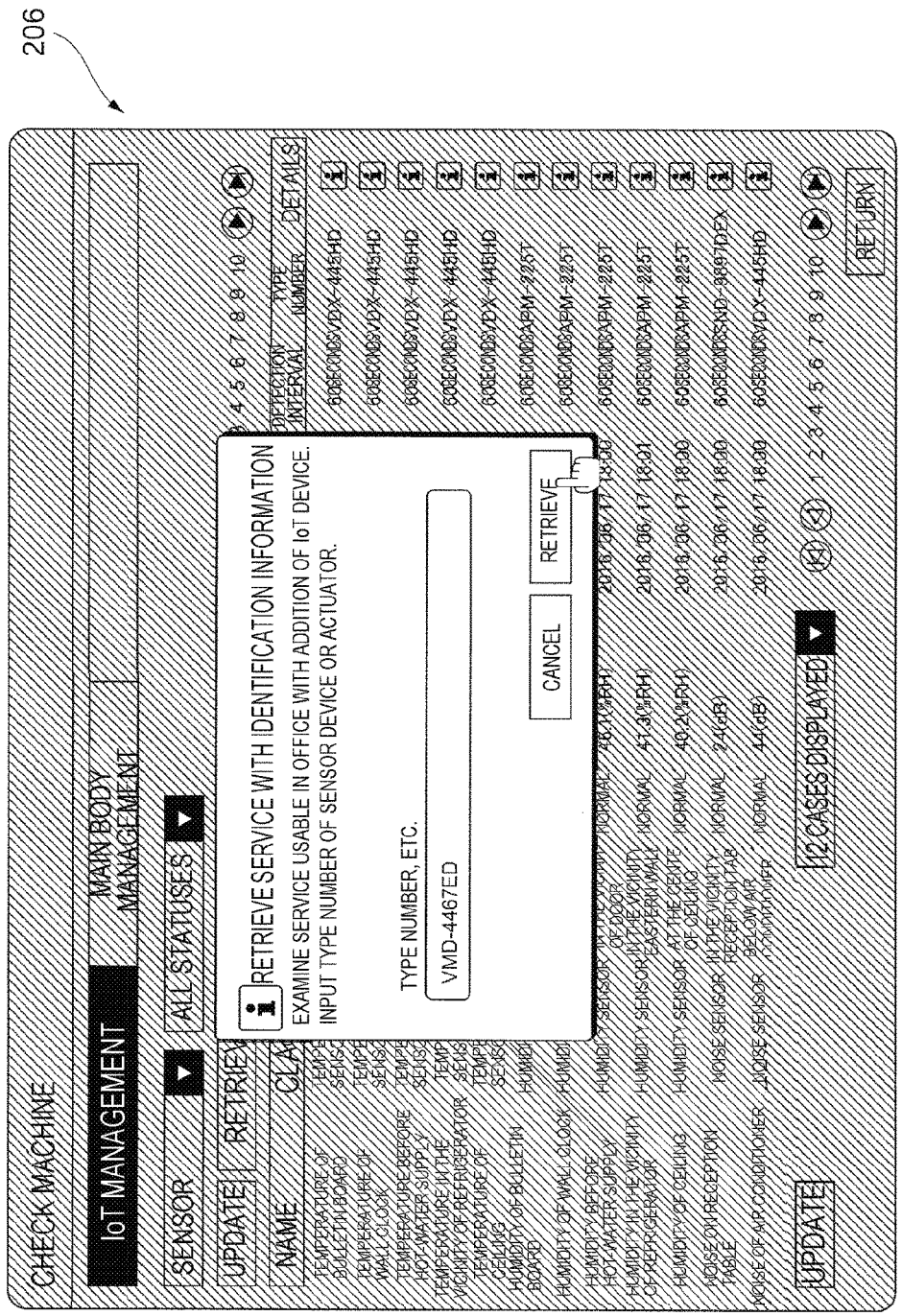
FIG. 16 is a diagram for describing an example of a processing executed in the office environment management system.

FIG. 16 illustrates a status after the type number of the sensor 50 or the type number of the actuator 30 is input and when the type number of the sensor 50 or the type number of the actuator 30 is input, a "retrieve" button is subsequently pressed by the user. Further, in the exemplary embodiment, a case where the type number of the sensor 50 or the actuator 30 is input by a hand of the user is described as an example, but the type number of the sensor 50 or the actuator 30 may be input by reading a barcode appended in the sensor 50 or the actuator 30.

When the "retrieve" button is pressed by the user, the display screen is switched to notify the user of a gist that the processing is in progress with respect (not illustrated).

When the "retrieve" button is pressed by the user, information on the input type number is transmitted to the information output server 20. In addition, in the exemplary embodiment, in addition to the information on the type number, the information (the provided device information stored in the information storage unit 211) on the sensor 50 and the actuator 30 registered in the image forming apparatus 200 and the information on the service already provided to the user through the image forming apparatus 200 are transmitted to the information output server 20.

When the information output server 20 receives the information, the information output server 20 retrieves the new service which is providable to the user in the office room and outputs (transmits) the information on the retrieved new service to the image forming apparatus 200.

More specifically, a table in which a relationship between the device and a providable service is written is stored in the information output server 20 of the exemplary embodiment, and the information output server 20 determines the providable service by referring to the table to output (transmit) the information on the service to the image forming apparatus 200.

The UI 206 (notifying unit 213) of the image forming apparatus 200 displays the information on the service which may be newly provided on the display screen and notifies the user of the displayed information.

FIG. 17 is a diagram illustrating an example of the display screen in the UI 206 of the image forming apparatus 200.

In the exemplary embodiment, as described above, in the information output server 20, the newly providable service is retrieved, and the information on the retrieved service is transmitted from the information output server 20 to the image forming apparatus 200. Further, the information on the device required for providing the service is transmitted to the image forming apparatus 200 from the information output server 20.

The notifying unit 213 (see FIG. 3) as an example of a notifying section receives the information to display the information as illustrated in FIG. 17.

A service name of the newly providable service and the vendor of the service are displayed on the display screen illustrated in FIG. 17. Further, when an additional device is required for providing the new service, information on the additional device is displayed. In other words, the information on the device required for providing the service is displayed.

Meanwhile, a case where the additional device is not required (a case where the user already has the device) is displayed as "none." Further, the detail button 209 selected by the user when the user wants to know the details of each service is displayed at the right end of the display screen.

In the exemplary embodiment, as described above, the information (provided device information) on the device already registered in the image forming apparatus 200 and information (specific device information) on a (specific) device, which the user newly inputs are transmitted to the information output server 20, and the information output server 20 determines the newly providable service based on the provided device information and the specific device information.

However, the present invention is not limited thereto, and only the provided device information may be transmitted to the information output server 20, and the newly providable service may be determined based on only the provided device information.

Herein, when the user thinks singly using the device for each device in using the device, a use range of the device may easily stay only in a function of the device. In this regard, plural devices are combined to increase utilization widths thereof and the combination of the devices is diversified, and as a result, there are a lot of difficulties in using the devices by combining the plural devices by individual users. In this regard, in a configuration of the exemplary embodiment, a use method of the plural devices is presented to the user to increase the utilization widths of the devices.

In the exemplary embodiment, for example, in the case where the user considers purchasing a new device, when the user inputs information for specifying the device, the user may determine a service which may be provided when the user purchases the device, as illustrated in FIG. 16.

FIGS. 18 to 21 are diagrams for describing another example of the processing executed in the office environment management system 1 of the exemplary embodiment.

Figure 18:
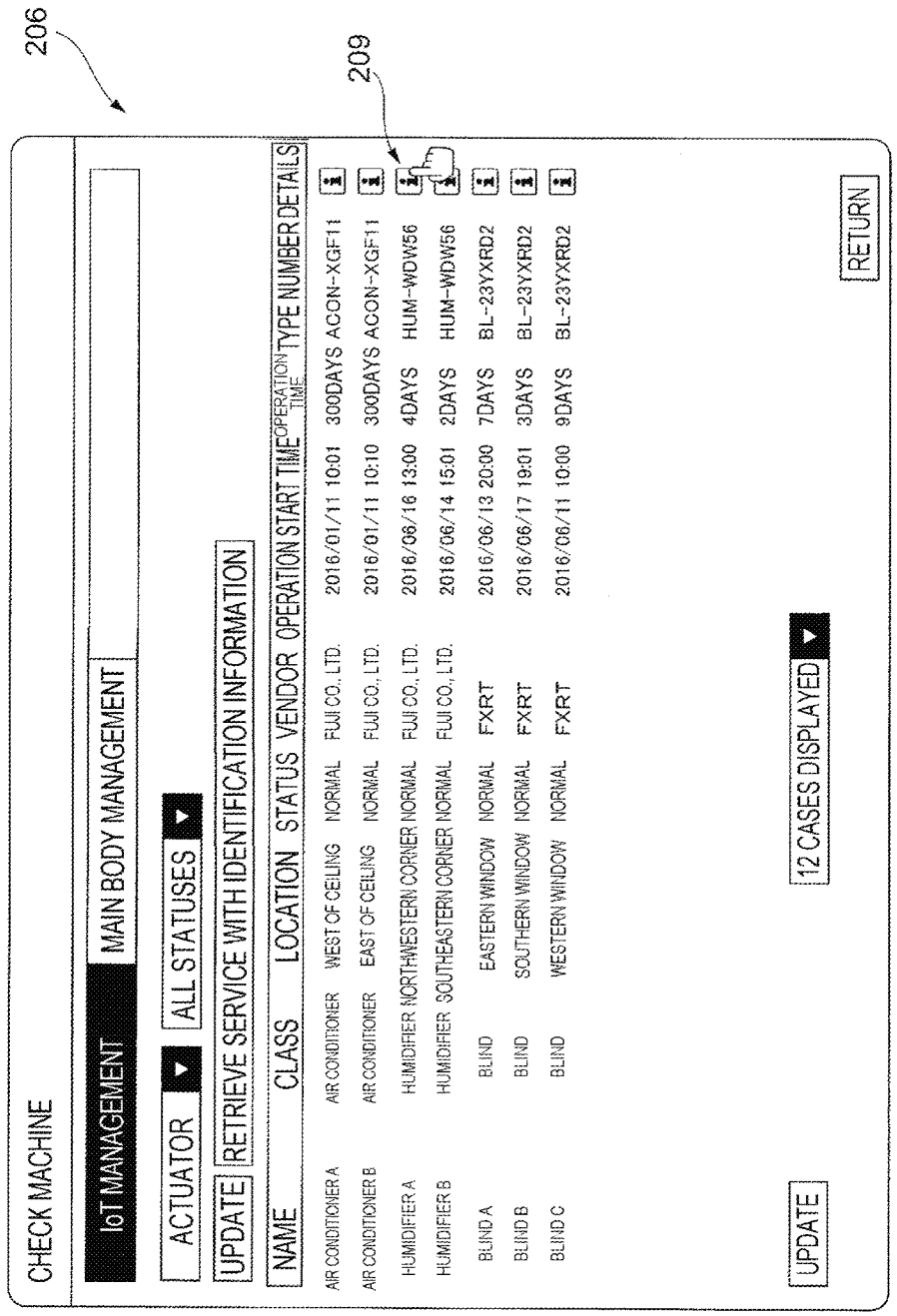
FIG. 18 is a diagram for describing another example of the processing executed in the office environment management system.

FIG. 18 is a diagram illustrating a display screen when the list of the actuators 30 is displayed and further, the detail button 209 of "humidifier A" at a third row is selected by the user.

Figure 19:
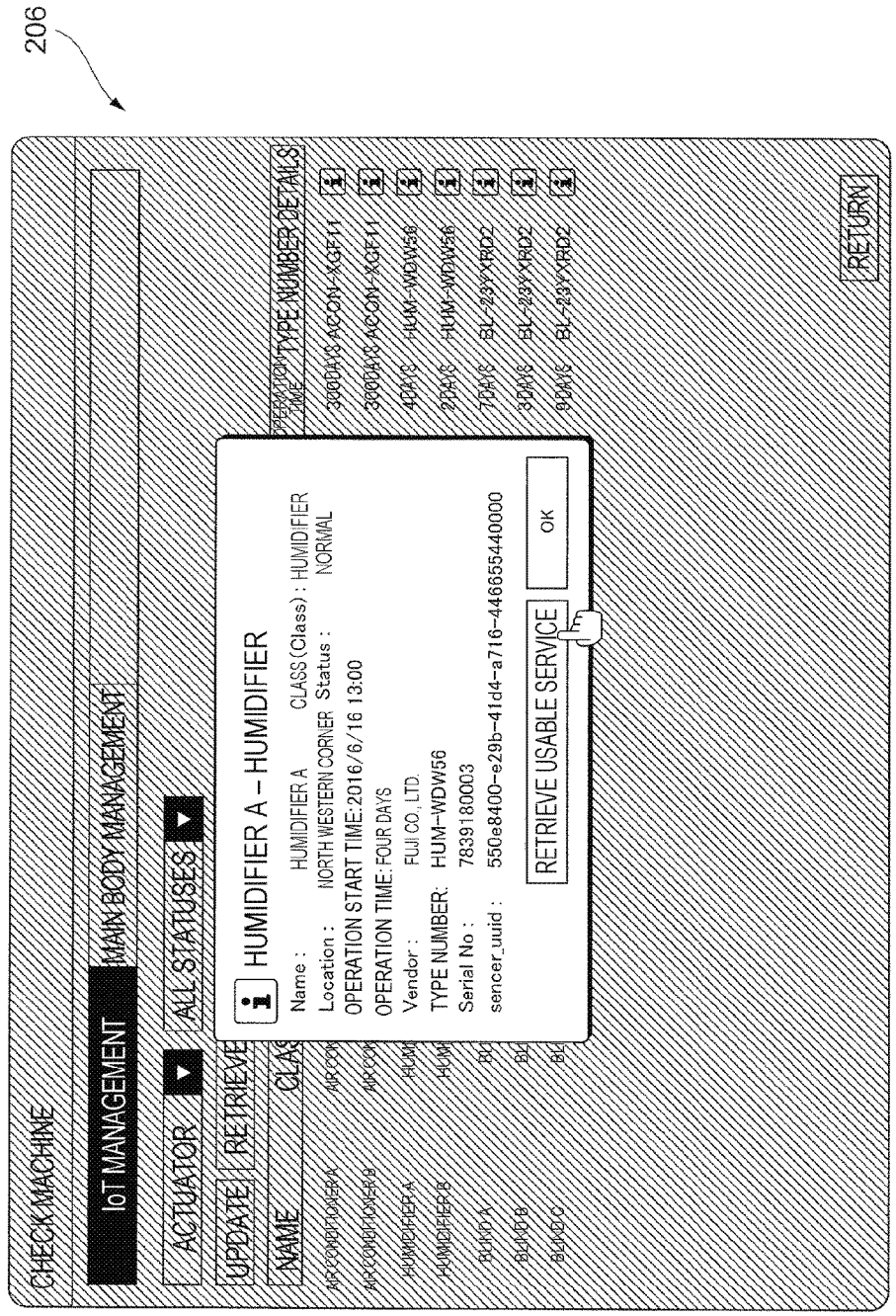
FIG. 19 is a diagram for describing another example of the processing executed in the office environment management system.

FIG. 19 is a diagram illustrating a display screen after the detail button 209 of "humidifier A" at the third row is selected by the user.

When the detail button 209 of "humidifier A" is selected by the user, the name, the class, the provision location, the status, the operation start time, the operation time, the vendor, the type number, the serial No., the UUID, and the like of the actuator 30 (humidifier A) are displayed on the display screen as illustrated in FIG. 19.

A button (a button where "retrieve a usable service" is displayed in the drawing) for retrieving the service is displayed on the display screen. In other words, a "retrieve button" for retrieving the service which is providable by using "humidifier A" is displayed.

When the "retrieve button" is pressed, the display screen is switched to a screen displaying that retrieval is in progress (not illustrated).

When the retrieve button is pressed, the information on "humidifier A" and the information (provided device information) of the device already registered in the image forming apparatus 200 are transmitted to the information output server 20.

The output unit 20B of the information output server 20 determines the providable service by retrieving a newly providable service (a service which may be provided by using "humidifier A"), based on the information on "humidifier A" and the provided device information.

The output unit 20B transmits (outputs) the information on the providable service to the image forming apparatus 200. In addition, the notifying unit 213 of the image forming apparatus 200 receives and displays the information on the providable service (notifies the user of the received and displayed information).

Figure 20:
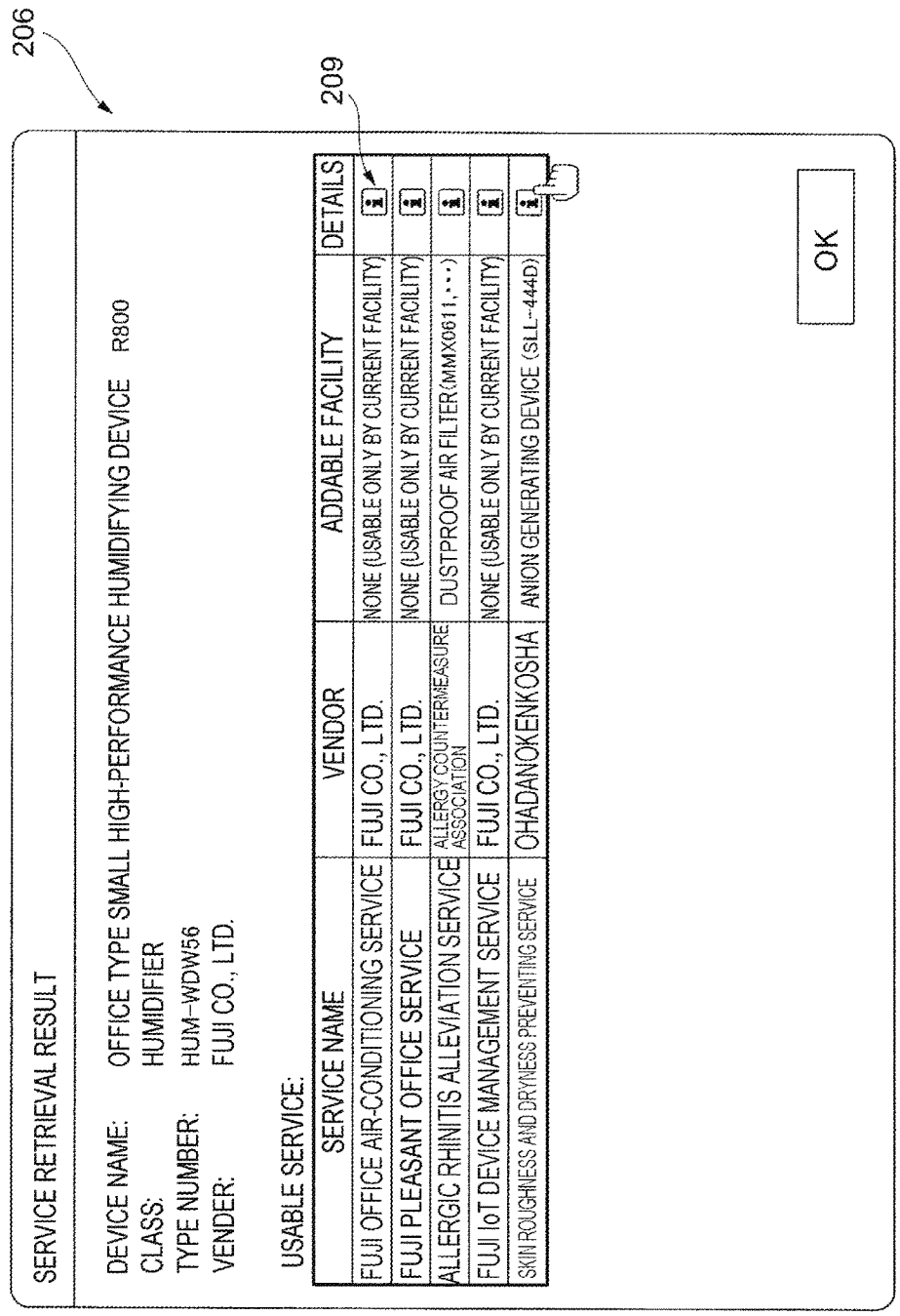
FIG. 20 is a diagram for describing another example of the processing executed in the office environment management system.

FIG. 20 is a diagram (a diagram illustrating a notifying result by the notifying unit 213) illustrating an example of the display screen in the UI 206 of the image forming apparatus 200.

In the exemplary embodiment, as described above, in the information output server 20, the newly providable service is retrieved (determined), and the information on the newly providable service is transmitted to the image forming apparatus 200. Further, the information output server 20 transmits to the image forming apparatus 200 the information on the device required for providing the service.

When the image forming apparatus 200 receives the information, the notifying unit 213 of the image forming apparatus 200 displays the list of the newly providable service (the service which may be provided by using "humidifier A") as illustrated in FIG. 20.

The service name of the newly providable service and the vendor of the service are displayed on the display screen illustrated in FIG. 20. Further, the information on the device required for providing the new service is displayed for each service.

In displaying the information on the required device, when an additional device is required (when another device is separately required), information on the additional device is displayed. Further, when the additional device is not required (when the service may be provided to the device already registered in the image forming apparatus 200), "none" is displayed.

The detail button 209 selected by the user when the user wants to know the details of each service is displayed at the right end of the display screen.

Herein, for example, when the detail button 209 at the fifth row is selected by the user, the display screen is switched to a display screen illustrated in FIG. 21.

A list of devices which may be added is displayed on the display screen. Further, a feature of each device is displayed in a comment field and further, a facility name of each device and a purchase site when each device is purchased are displayed on the display screen.

In the exemplary embodiment, for example, when the purchase site at the third row from the top is selected, the purchase site is accessed. In addition, requirements are input in the purchase site to purchase the additional device. In addition, when the user accepts this device to receive a service positioned at the fifth row among the services presented in FIG. 20.

Another processing example of the office environment management system 1 is described.

FIG. 22 is a diagram illustrating another example of the display screen in the UI 206.

A list of the services which are providable to the user in the office room is displayed on the display screen. More specifically, the service name, the vendor of the service, and the detail button 209 are displayed for each service.

Additionally, in the processing example, the information on the service which is providable to the user is stored in the information output server 20, the user operates the UI 206 of the image forming apparatus 200, and as a result, the information is transmitted to the image forming apparatus 200. Therefore, the list of the providable services is displayed in the UI 206 of the image forming apparatus 200 as illustrated in FIG. 22.

In the processing example, a case where "Fuji office air-conditioning service" at the first row is selected by the user is presumed.

When "Fuji office air-conditioning service" at the first row is selected, the transmitting unit 212 (see FIG. 3) of the image forming apparatus 200 transmits information on the selected service to the information output server 20.

The service information acquiring unit 20D (see FIG. 5) of the information output server 20 receives and acquires the information on the transmitted service.

In the exemplary embodiment, when the information on the service is transmitted to the information output server 20, the transmitting unit 212 of the image forming apparatus 200 transmits even the information (provided device information) stored by the information storage unit 211 of the image forming apparatus 200 to the information output server 20.

The provided device information acquiring unit 20A of the information output server 20 receives and acquires the transmitted provided device information.

In the information output server 20, the output unit 20B outputs the information on the device required for the service based on the information on the service acquired by the service information acquiring unit 20D and the provided device information acquired by the provided device information acquiring unit 20A.

The information on the required device is transmitted to the image forming apparatus 200. Besides, the notifying unit 213 of the image forming apparatus 200 receives and displays the information on the required device.

In this case, on the display screen of the image forming apparatus 200, for example, a message "humidifier is further required in providing an office air-conditioning service" is displayed.

When the additional device is not required, for example, a message "additional device is not required" is displayed on the display screen.

Herein, when the user hopes to provide the service, even a case where it may not be known whether the user has the device for receiving the service is presumed.

In the exemplary embodiment, such a situation is presumed and in the exemplary embodiment, when the user hopes to provide the service, the user selects the service which the user hopes to provide and the information on the selected service and the information on the device which the user has at that time are transmitted to the information output server 20, as described above.

The information output server 20 determines whether the device is insufficient. More specifically, the information output server 20 stores information on plural services and stores information on a device required for providing each service.

The information output server 20 determines whether the device is insufficient based on the information (the information stored in the information output server 20) and the information (the information on the service desired by the user and the provided device information) transmitted from the image forming apparatus 200.

When the information output server 20 determines that the device is insufficient, the information output server 20 determines the insufficient device to transmit information on the corresponding device. In this case, as described above, a message for notifying of the insufficient device is displayed in the image forming apparatus 200.

When the device is sufficient, the information output server 20 transmits information indicating that the device is sufficient to the image forming apparatus 200. In this case, a message indicating that the device is sufficient is displayed in the image forming apparatus 200 as described above.

Another processing example of the office environment management system 1 is described.

In the processing, first, a detection result (the situational information which is information on the situation of the office room) by the sensor 50 (see FIG. 1) provided in the office room is transmitted to the information output server 20 by the transmitting unit 212 of the image forming apparatus 200.

More specifically, in the exemplary embodiment, the sensor 50 acquires the situational information such as the temperature or humidity in the office room. In addition, the transmitting unit 212 of the image forming apparatus 200 transmits the situational information to the information output server 20. In addition, the situational information acquiring unit 20E (see FIG. 5) of the information output server 20 acquires the situational information.

Similarly thereto, the transmitting unit 212 of the image forming apparatus 200 transmits the information (provided device information) on the device provided in the office room to the information output server 20. In addition, the provided device information acquiring unit 20A of the information output server 20 acquires the provided device information.

Subsequently, the output unit 20B outputs the information on the service which is providable to the user in the office room, based on the situational information acquired by the situational information acquiring unit 20E and the provided device information acquired by the provided device information acquiring unit 20A. In addition, the information is transmitted to the image forming apparatus 200 and similarly thereto, the information is displayed by the notifying unit 213 of the image forming apparatus 200.

More specifically, the information output server 20 stores a relationship of the situational information, the provided device information, and the providable service as the table.

The output unit 20B determines the service which is providable to the user in the office room by referring to the situational information transmitted from the image forming apparatus 200, the provided device information transmitted from the image forming apparatus 200, and the table.

The output unit 20B outputs information on the determined service. In addition, the information is transmitted to the image forming apparatus 200 to be notified by the user through the notifying unit 213 of the image forming apparatus 200.

In the processing example, the situation in the office room is transmitted to the information output server 20 and further, in this case, the information on the device provided in the office room is transmitted to the information output server 20.

The information output server 20 outputs information on a service which is suitable for the situation in the office room and which is providable by using the device already possessed by the user, based on the information.

In this example, as described above, the information on the service which is providable by using the device already possessed by the user is output, but the present invention is not limited thereto and information on a service which may be provided as the user does not possess the device and gets a new device may be output and notified by the user. Further, in this case, similarly to the display example illustrated in FIG. 17, etc., the information on the device required for providing the service is also notified by the user.

In the above description, the situational information is acquired based on an output from the sensor 50, but for example, the situational information may be acquired based on the information which the user inputs through the UI 206.

Specifically, for example, the user manually inputs information such as "office room is hot," "the sunset is dazzling," etc., or information on the temperature of the office room, etc., through the UI 206 of the image forming apparatus 200 to acquire the situational information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   an information storage section configured to store provided device information which is information on a device provided in an office room;
   a transmitting section configured to transmit the provided device information stored by the information storage section to a server in response to a user request for a service; and
   a notifying section configured to receive and notify of information on the service output by an external device other than the information processing apparatus and the server, based on the provided device information,
   wherein the service comprises at least one of capturing sensor data from the office room or providing an actuation in the office room.

2. The information processing apparatus according to claim 1, comprising:
   an image forming apparatus configured to form an image on a recording medium.

3. The information processing apparatus according to claim 1, wherein the device comprises at least one of an actuator and a sensor,
   the provided device information is obtained by the information storage section from the at least one of the actuator and the sensor, and
   the information on the service is received by the information processing apparatus from the server.

4. The information processing apparatus according to claim 1, wherein the information storage section is further configured to store a plurality of provided device information,
   wherein the plurality of provided device information comprises the provided device information and also information on other devices different than the information processing apparatus and the server,
   wherein the information on the other devices is obtained by the information processing apparatus from any of the other devices and sensors, separate from the other devices and the information processing apparatus, and
   the notifying section is further configured to receive and notify, by displaying on a user interface, a plurality of other information on a plurality of other services, other than the service, output by ones of the other devices, based on the plurality of provided device information.

5. The information processing apparatus according to claim 4, wherein the notifying section is further configured to display a list on the user interface,
   wherein the list indicates of the service, the other services, the devices and the other devices.

6. The information processing apparatus according to claim 1, wherein the user request comprises a type number of any of a sensor device and an actuator, and
   wherein the notifying section is further configured to receive, from the server, and display a list of a plurality of service names determined by the server as corresponding to the type number.

7. The information processing apparatus according to claim 6, wherein the list indicates the plurality of service names, a plurality of vendors of the plurality of service names, a plurality of facilities, to which the server determined that a plurality of services, comprising the service, of the service names may be added, and a plurality of details.

8. The information processing apparatus according to claim 7,
   wherein the plurality of details comprises descriptions of the plurality of services, facilities which the server determined to correspond to the plurality of services, and links to a plurality of websites at which ones of devices, configured to provide ones of the plurality of services, may be purchased as determined by the server.

9. The information processing apparatus according to claim 1,
   wherein the server is configured to determine, in response to the user request, that the external device is configured to output the service.

10. The information processing apparatus according to claim 1, wherein the device provided in the office room is at least one of a sensor and an actuator,
    the information processing apparatus is also provided in the office room with the at least one of the sensor and the actuator, and
    the external device, other than the information processing apparatus and the server, is another sensor that is not provided in the office room.

11. The information processing apparatus according to claim 1, wherein the service further comprises at least one of sensing, at least one of a temperature, a humidity and a noise from the office room, and providing an actuation in the office room.

12. An information processing apparatus comprising:
    an information storing section configured to store provided device information which is information on a device provided in an office room;
    a transmitting section configured to transmit the provided device information stored by the information storing section to the outside in response to a user request for a service; and
    a notifying section configured to receive and notify information on a device required for providing the service, the information being output by an external device based on the provided device information and information on another service which is providable to a user in the office room,
    wherein the service comprises at least one of capturing sensor data from the office room or providing an actuation in the office room.

13. The information processing apparatus according to claim 12, comprising:

an image forming apparatus configured to form an image on a recording medium.

14. An information processing apparatus comprising:
a situational information acquiring section configured to acquire situational information which is information on a situation in an office room;
an information storage section configured to store provided device information which is information on a device provided in an office room;
a transmitting section configured to transmit the situational information acquired by the situational information acquiring section and the provided device information, stored by the information storage section to a server, in response to a user request for a service; and
a notifying section configured to receive and notify information on the service output by an external device other than the information processing apparatus and the server based on the situational information and the provided device information,
wherein the service comprises at least one of capturing sensor data from the office room or providing an actuation in the office room.

15. The information processing apparatus according to claim 14, comprising:
an image forming apparatus configured to form an image on a recording medium.

* * * * *